United States Patent [19]
Gibson

[11] Patent Number: 6,112,875
[45] Date of Patent: Sep. 5, 2000

[54] CONVEYOR FRAME ROLLER SHAFT ALIGNMENT STRIP AND CONVEYOR REPAIR METHOD

[76] Inventor: Edward F. Gibson, 4522 Oak Pointe Dr., Louisville, Ky. 40245

[21] Appl. No.: 09/211,634

[22] Filed: Dec. 15, 1998

Related U.S. Application Data

[60] Provisional application No. 60/111,686, Dec. 10, 1998, and provisional application No. 60/112,001, Dec. 15, 1997.

[51] Int. Cl.[7] ................................................. B65G 13/00
[52] U.S. Cl. ...................................... 193/35 R; 29/402.14
[58] Field of Search ........................... 29/402.09, 402.14, 29/402.16; 156/94, 242, 281; 198/860.2, 861.1; 193/35 R

*Primary Examiner*—Michael W. Ball
*Assistant Examiner*—Jessica Rossi
*Attorney, Agent, or Firm*—Brooks & Kushman P.C.

[57] ABSTRACT

The method and apparatus for repairing worn frame rails of a roller conveyor is described in which a multi-layer reinforcement strip having a layer of sheet metal and at least one layer of high density plastic material is affixed to the worn frame rails. The reinforcement strip is provided with a plurality of openings formed therein, corresponding in size and spacing to the series of openings in the frame rail prior to being worn for supporting a series of roller support shafts. The multi-layer re-aligns the rollers and reduces conveyor vibration.

15 Claims, 3 Drawing Sheets

CONVEYOR FRAME ROLLER SHAFT ALIGNMENT STRIP AND CONVEYOR REPAIR METHOD

CROSS-REFERENCE TO RELATED APPLICATIONS

This application claims the benefit of two U.S. provisional applications; Ser. No. 60/111,686, which was filed Dec. 10, 1998 and Ser. No. 60/112,001, which was effectively filed Dec. 15, 1997 as a result of conversion of U.S. application Ser. No. 08/990,513 filed Dec. 15, 1997 to a provisional application by way of a petition filed on Dec. 11, 1998.

TECHNICAL FIELD

The present invention relates to methods and apparatus for repairing worn roller conveyor frame rails in which a roller shaft is received within a correspondingly shaped opening in the frame rail.

BACKGROUND ART

Warehouse Managers and Plant Managers are consistently faced with the problems of deteriorating conveyor systems within their facilities and replacing these systems is a great expense to the companies. To date, no one has provided a resolution for restoring axle/shaft cutout holes/slots or the structural stability of an existing conveyor frame and reducing the static electricity as well as the sound level of an existing conveyor system.

Conveyor roller systems are comprised of several rollers mounted between two parallel rails. The rollers are mounted via a shaft which runs through the middle of each roller and extends outward for several inches on each end of the roller. These shaft ends are inserted into cutouts on the rails which are usually hexagonal holes or hexagonal slots.

The rail cutouts are slightly larger than the shaft size so as to allow insertion of the roller shaft which also allows vibration of the roller shaft during operation of the roller conveyor system. In time, this vibration causes a distortion of the holes/slots and requires replacement of the railings.

A means for correcting the distortion other than having to replace the railing system and/or the entire conveyor system is desirable. Simple installation is also desirable so as to minimize conveyor system downtime.

Raymond T. Boschert created a spring clip, U.S. Pat. No. 5,415,272, which attempts to address vibration sound levels by pushing the roller axle/shafts against one side of the elongated cutout. Although this may reduce the sound level, it causes the rollers to become out of line resulting in more wear on the entire conveyor system as a whole. It does not attempt to correct the cutout shape, reduce static electricity or provide any additional structural stability to the existing railing/frame. In addition, the spring clip does not provide any additional safety for workers nor does it extend the life of the existing railing/frame by any extended amount of time.

DISCLOSURE OF INVENTION

This product was invented to improve the existing conveyor frames used in the conveyor industry. This product is able to repair and reinforce the existing frame rail cutouts used for the insertion of the roller axle/shafts on a conveyor system. After years of use, the existing frame rail cutouts on the system will wear resulting in round or elongated cutouts versus the original hexagonal and/or hexagonal slot cutouts. This distortion of the hexagonal slots and/or cutouts results in a great deal of sound from the vibration of the roller axle/shafts as well as weakening of the existing frame at the point of the elongated cutouts.

One of the objectives of this invention is to extend the life of a conveyor frame and thereby greatly reduce the expense of maintaining a working conveyor system. Replacing an entire conveyor frame is a great expense and normally includes the replacement of the controls, drives and rollers. This product attaches to the outside of the existing frame, thus restoring the structural integrity of the frame cutouts allowing the user to retain the existing controls, drive and rollers as well as the existing conveyor frame.

Accordingly, a reinforcement strip is provided for repairing worn frame rails of a roller conveyor having a pair of spaced apart frame rails with a series of openings formed therein for receiving the end of a series of roller support shafts. The reinforcement strip is made up of at least one layer of metal and at least one layer of high density plastic having a plurality of openings formed corresponding in size and spacing to the series of openings in the frame rail prior to becoming worn. The multi-layer reinforcement strip is attached directly to the worn frame rail to support the ends of the roller support shafts protruding there through wherein the multi-layer reinforcement strip realigns the rollers and reduces conveyor vibration.

This product includes a layer of sheet metal such as steel which is laminated between two layers of high density plastic such as UHMW Polyethylene. This steel layer is used to reinforce the structural stability of both the product and the existing frame. The cutouts used to insert the roller axle/shafts will remain in tact longer with the steel reinforcement. UHMW Polyethylene is a product commonly used to increase durability. The steel and the UHMW Polyethylene work in conjunction, reinforcing one another. The UHMW Polyethylene provides a wear surface for the vibration of the roller axle/shafts and the steel provides structural stability to the UHMW Polyethylene. Not only is the expense of replacing an entire conveyor system eliminated, but the time and labor needed to attach this product to an existing frame is a fraction of that needed to replace an entire conveyor system.

There is also a need to control static electricity in existing conveyor systems in today's market. Static electricity can build up in a conveyor system to the point of unsafe levels. This product is able to reduce the static electricity build-up in conveyor systems due to its UHMW Polyethylene shell separating the steel shaft from the existing steel frame. The UHMW Polyethylene acts as an electrically conductive material which can control static electricity to the ground screw which attaches the product to the frame and in turn, grounds it back through the conveyor frame to the original ground. Consequently, the product makes the existing conveyor system safer for the people working around this system. It is also more effective than running a wire from each roller to the frame as is currently done. Over years, the wire will wear out and tend to break away preventing the system from being grounded for static electricity build-up.

This product also addresses the problem of sound reduction. When an existing conveyor system has been in use for years, the cutouts and/or slots used for insertion of the roller axle/shafts become distorted. This causes more movement of the shaft within the cutout which results in an increased noise level due to the metal of the roller shaft engaging the metal of the frame. The realigned cutouts provided by the product would have a minimal vibration and thus, a lower sound level. The UHMW Polyethylene shell of the product also reduces the noise level by absorbing vibrations.

BEST MODE FOR CARRYING OUT THE INVENTION

Figure 1:
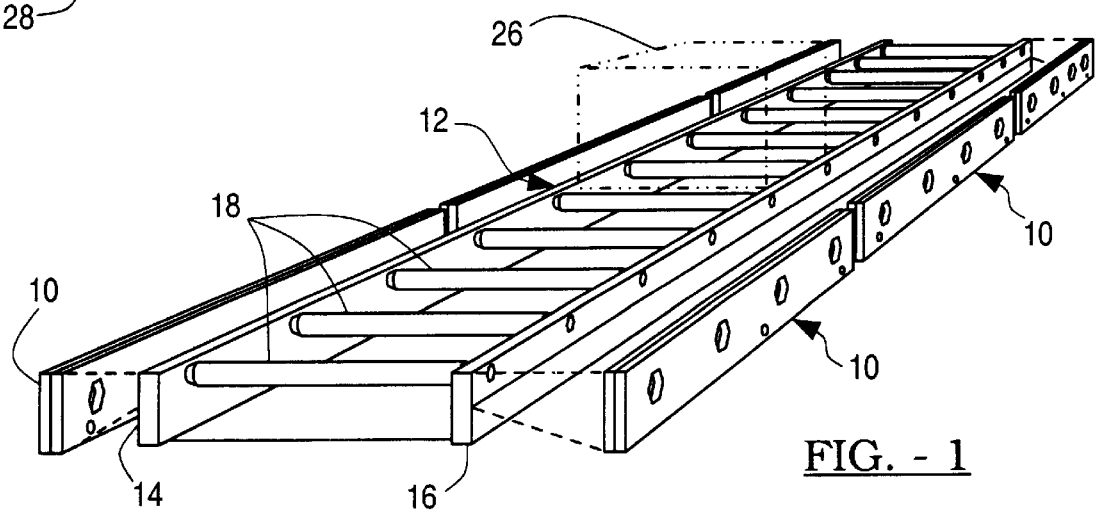
FIG. 1 is a perspective view of a roller conveyor utilizing a first embodiment of the invention.

An elongate multi-layer reinforcement strip 10 of the present invention is shown in FIG. 1 adjacent a conventional roller conveyor 12 to which reinforcement strips 10 are to be attached. Roller conveyor 12 is made up of a pair of spaced apart frame rails, 14 and 16 and a series of rollers 18 that are uniformly spaced along the length of the conveyor. Rollers 18 are each made up of an elongate shaft 20 best seen in FIG. 2. Shaft 20 in the preferred embodiment is provided with hexagonal ends which are sized to fit within hexagonal openings 22 formed in frame rail 16. Rotatably mounted about roller shaft 20 is roller cylinder 24 which is freely pivotally mounted to roller shaft by a series of conventional bearings not shown. When an object such as box 26, shown in FIG. 1, is pushed along the roller conveyor, roller cylinders 24 of each of the rollers 18, rotate while roller shaft 20 remains fixed relative to the frame rails due to the cooperating hexagonal ends of the roller shafts 20 and the corresponding hexagonal openings 22 in the frame rails.

After extended periods of use, the frame rail openings 22 wear to the point where the play between the ends of rollers shaft 20 and the hexagonal opening 22 in the frame rail is excessive and detracts from conveyor performance. Excessive frame rail wear will cause the conveyor to become very noisy and objects transported on the conveyor will begin to experience tracking problems.

Figure 2:
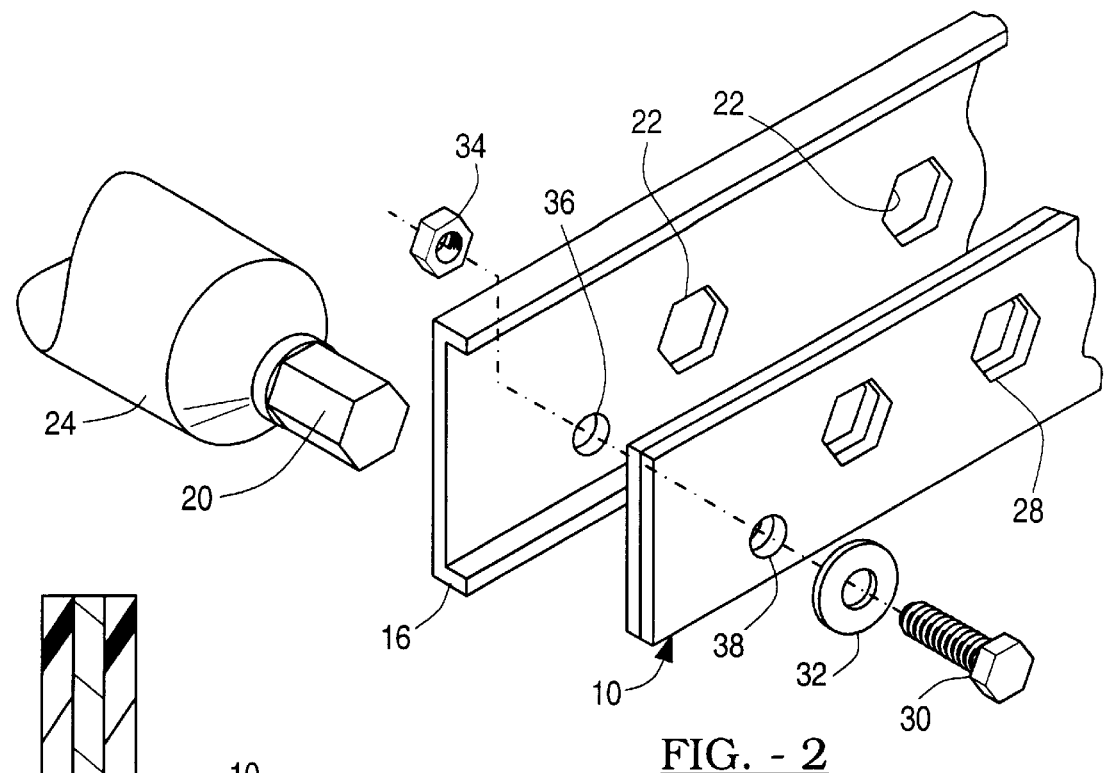
FIG. 2 is an enlarged perspective view of the embodiment of the invention shown in FIG. 1.
Figure 3:
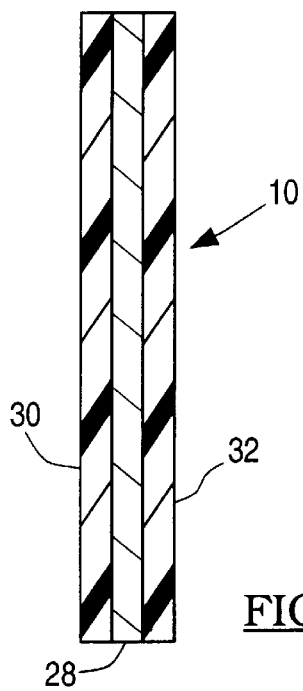
FIG. 3 is a cross-sectional view of the multi-layer reinforcement strip.

The multi-layer reinforcement strip 10 of the present invention, is designed to correct frame rail wear problems without necessitating the replacement of the conveyor or the worn frame rail. Multi-layer reinforcement strip 10 is an elongate member formed of at least two layers; a layer of sheet metal 28 and at least one layer of high density plastic material 30 as illustrated in FIG. 3. In the embodiment illustrated in FIGS. 1, 2 and 3, reinforcement strip 10 is made up of three layers; a central layer of sheet steel, a pair of high density plastic layers 30 and 32 on opposite sides of the sheet steel layer 28 which sandwich the sheet steel layer there between. In the embodiment illustrated in FIG. 3, the high density plastic material utilized is Polyethylene, in particular, ultra high molecular weight (UHMW) Polyethylene.

It is advantageous to have UHMW Polyethylene layers formed from recycled material. Recycled material is not only less expensive than virgin material, but it has less thermal expansion and higher static electricity conductivity; all of which are desirable in the present application. Preferably, at least one layer of high density plastic material has a thickness falling within the range of 0.05 to 0.15 inches. In applications where two high density plastic material layers are utilized on opposite sides of the sheet metal layer, plastic thickness selected could be at the low end of the recited range. In the preferred embodiment illustrated in FIG. 3, plastic layers are approximately $\frac{1}{16}$ of an inch in thickness. A sheet metal layer 28 should have a thickness formed in the range of 0.062 to 0.200 inches. Preferably, sheet metal layers formed of the sheet steel, the sheet metal layer is 0.100 to 0.150 inches in thickness and most preferably approximately $\frac{1}{8}$th of an inch in thickness.

High density plastic material layers 30, 32 are bonded securely to sheet metal layer 28 forming an integral unit. The elongate multi-layer reinforcement strip is provided with a plurality of openings 28 formed therein along the length of the strip. Openings 28 have a size and a spacing which correspond to the series of openings 22 and frame rail 16 prior to the frame rail becoming worn. The multi-layer strip 10 is attached directly to the frame rail utilizing conventional fasteners such as bolt 30, washer 32 and nut 34 illustrated in FIG. 2. When using nut and bolt type fasteners or rivets, it is necessary to punch or drill holes 36 in frame rail 16 at spaced apart intervals corresponding to apertures 38 formed in reinforcement strip 10. Of course, other attachment mechanisms such as a series of small C-shaped clamps can also be used to attach reinforcement strip 10 to frame rail 16 in a secure manner. It is desirable that the overall thickness of reinforcement strip 10 is between 0.200 and 0.500 inches. Since typically the hexagonal ends of roller shaft 20 are designed to protrude a novel $\frac{3}{8}$" beyond frame rail 16, it is therefore not necessary to have a reinforcement strip 10 substantially thicker than $\frac{3}{8}$". In the preferred embodiment illustrated in FIG. 3, reinforcement strip 10 has a nominal thickness of $\frac{1}{4}$".

Multi-layer reinforcement strips 10 must be made to specifically fit the roller conveyor being repaired and have matching opening geometry and spacing. The multi-layer strip has hexagonal openings 22 in the frame rail. For example, a roller conveyor having 1.9" diameter rolls on 2" centers will have to have openings spaced on 2" centers. Typically, frame rails will have hexagonal openings $\frac{7}{16}$" across the flats. The hexagonal opening may be formed to flat down as illustrated in FIG. 2 or point down, i.e. the hexagonal opening rotated 30° relative to that shown in FIG. 2. Not only must the multi-layer reinforcement strip 10 have openings similarly sized and spaced as that of the frame rail, but the openings must have the same relative orientation to enable the hexagonal of roller shaft 20 to project through both the frame rail 16 and multi-layer strip 10. In the preferred embodiment illustrated in FIG. 1–3, the reinforcement strip 10 has a height of approximately 1½" and an overall length of 2'. Reinforcement strips have a longer or shorter length, i.e. 1½' to 3' lengths, can work satisfactorily, however, 2' lengths are best from an ease of installation standpoint.

Figure 4:
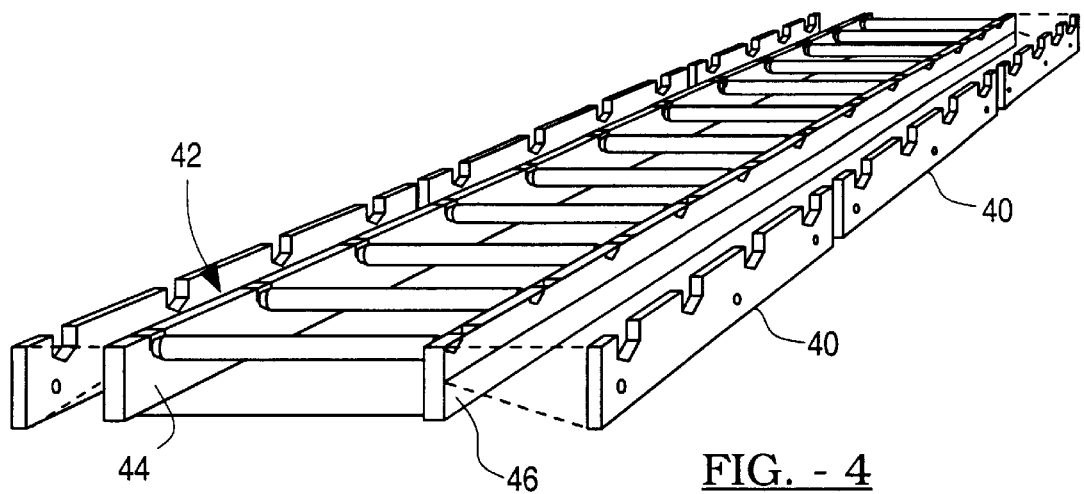
FIG. 4 is a perspective view of an alternative roller conveyor illustrating a second embodiment of the invention.
Figure 5:
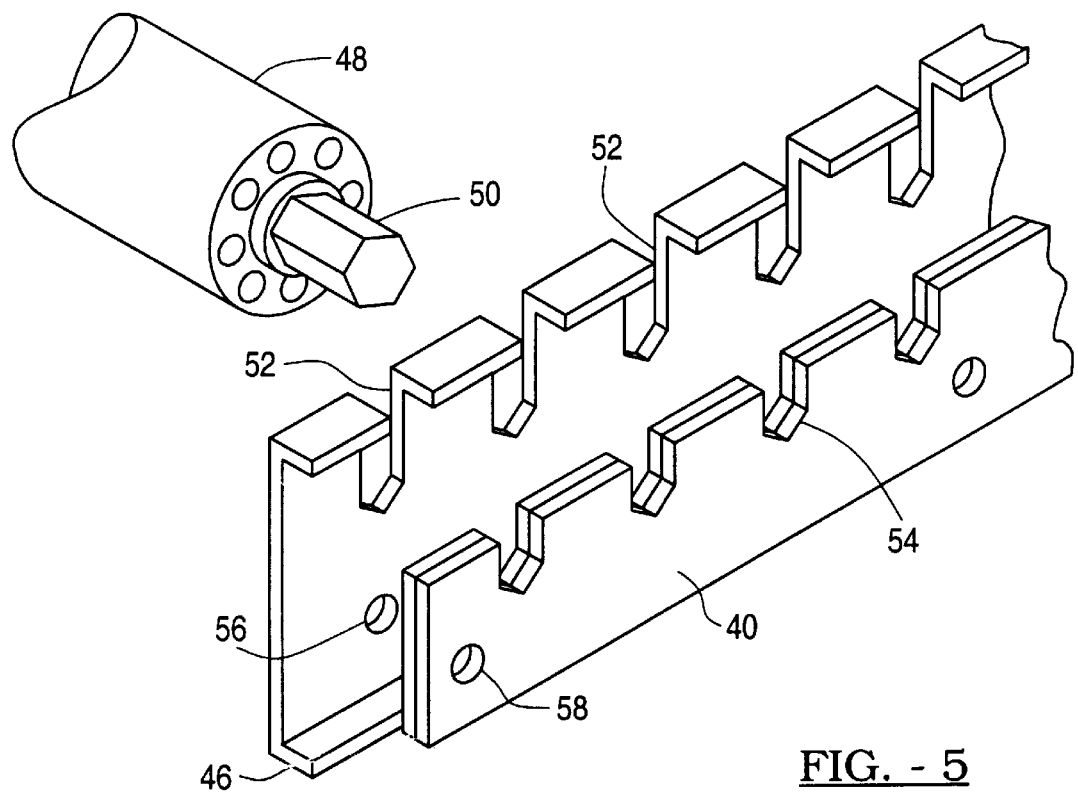
FIG. 5 is an enlarged view of a multi-layer reinforcement strip utilized in FIG. 4.

An alternative multi-layer reinforcement strip 40 is shown in FIGS. 4 and 5, installed on an alternative roller conveyor embodiment 42. Roller conveyor 42 is provided with a pair of side rails 44 and 46 and series of rollers 48 extending there between. Rollers 48 are identical to rollers 18 provided with reference to the first embodiment shown in FIGS. 1–3. Rollers 48 are provided with a roller shaft which extends through and has, hexagonal ends 50. Frame rail 46 is provided with a series of slot shaped openings 52 sized to receive roller shaft hexagonal end 50 in a point down manner with the fore and aft flats cooperating with the sizes of the slots 52 to prevent the roller shaft from turning. This type of conveyor is referred to as a drop-in roller type and is designed so that a roller can be easily pulled out for safety reasons; for example, in the case of an operator's hand or article of clothing becoming entrapped between adjacent rollers. When a roller conveyor is of the drop-in roller type, a series of openings formed in the frame rails are upwardly facing slots as illustrated in FIGS. 4–5, therefore, the corresponding shaped openings in the multi-layer reinforcement strip 40 must be correspondingly shaped as illustrated by openings 54 in reinforcement strip 40. As previously described, frame rail 46 will have preferably a series of holes 56 punched or drilled thereon at spaced apart intervals corresponding the location to apertures 58 formed in reinforcement strip 40 to facilitate installation of conventional fasteners. Reinforcement strip 40 can be made having the same multi-layer construction as described previously with respect to reinforcement strip 10. Alternatively, a multi-layer strip of either a through hole or a slot type opening design may be formed of an alternative construction as illustrated in FIGS. 6 and 7.

Figure 6:
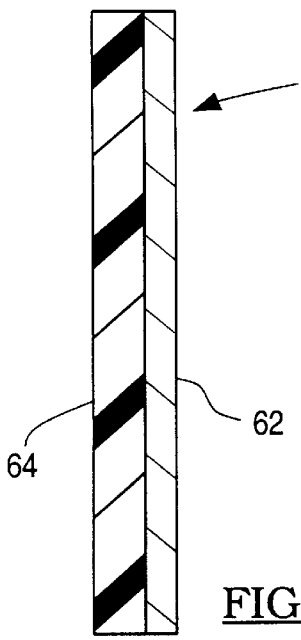
FIG. 6 is an enlarged cross-sectional end view of an alternative multi-layer reinforcement strip configuration.

FIG. 6 illustrates a multi-layer strip 60 having a single sheet metal layer 62 and a single high density plastic layer 64. When constructed of a single plastic layer design, plastic layer 64 should be oriented adjacent the frame rail so that the plastic layer is sandwiched between the sheet metal layer 62 and the steel frame rail. When a single plastic layer is utilized, the plastic may be thicker than the plastic layer used in a two layer sandwiched construction as shown in FIG. 3. With a single plastic layer, preferably the plastic layer is between 0.100 and 0.250" thick, the plastic layer provides a very tough wear resistant surface for supporting the roller shaft while a steel layer serves to provide structure and to clamp and retain the plastic material in place. This multi-layer design provides benefits that a steel only or plastic only design does not have. The multi-layer combination provides excellent wear characteristics, good structural stability and excellent vibration dampening and noise reduction.

Figure 7:
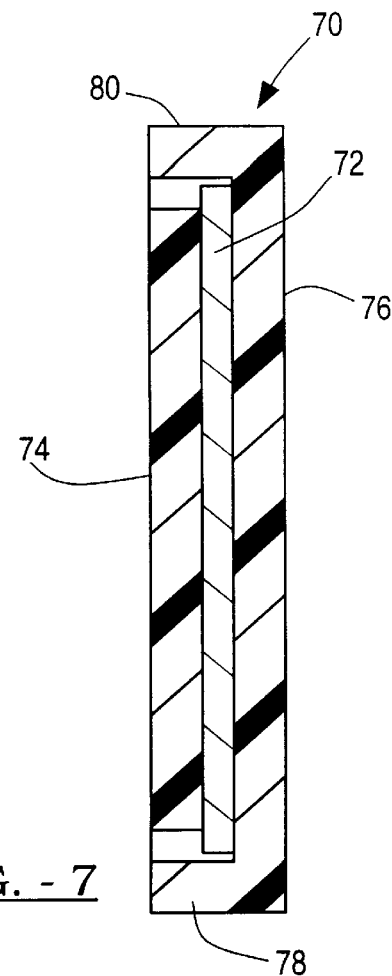
FIG. 7 is another alternative embodiment of a multi-layer reinforcement strip.

An alternative multi-layer reinforcement strip 70 is shown in FIG. 7. The reinforcement strip 70 has a central sheet metal layer 72 sandwiched between two high density plastic layers 74 and 76. In this design, plastic ends 78 and 80 serve to completely encapsulate the steel layer 72 in plastic material. This configuration is particularly well suited for fabrication using an insert injection molding technique.

There are a number of ways of manufacturing multi-layer strips in accordance with this invention. Multi-layer strip 70 shown in FIG. 7 is ideally suited for injection molding, while multi-layer strips 10, 40 and 60 shown in FIGS. 3, 5 and 6, are ideally suited for fabrication using various sheet lamination techniques. While numerous fabrication techniques will be readily apparent to those skilled in the art, several representative manufacturing techniques will be described briefly. The multi-layer reinforcement strip can be made using layers of sheet metal and plastic which have been pre-punched or a multi-layer strip can be formed and then the openings cut in subsequently. Due to the different modulus of elasticity of sheet metal and high density plastic material, conventional punch and die techniques are not typically suitable for forming necessary openings once a multi-layer laminate is formed. If it is desirable to form holes after the plastic and metal have been bonded together, holes can be formed using a laser or water jet saw. Preferably, the openings are formed in the sheet metal layer before lamination.

Figure 8:
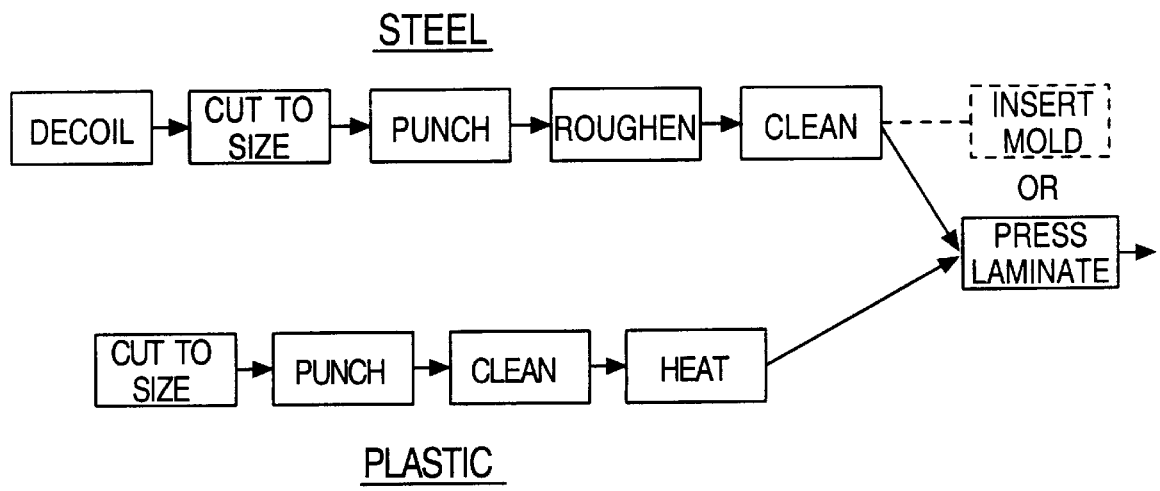
FIG. 8 is a schematic flow chart illustrating the method for making multi-layer reinforcement strips of the present invention.

As illustrated in FIG. 8, the steel stock is decoiled, cut to size and the openings and apertures punched therein. The material is then roughened and cleaned and is ready for adhering the plastic layer thereto. In the case of insert molding, the cleaned steel is then placed into a mold and the plastic material directly molded thereto. Any of the preceding designs can be formed utilizing insert molding, however, the reinforcement strip 70 in FIG. 7, can only be effectively formed using insert molding techniques.

When the multi-layer strip is to be laminated, the laminate layers are cut to size, punched, cleaned and heated. The heated plastic and metal sheets are then pressed together in a laminating press to securely bond the plastic and steel into a unitary part. It is necessary to properly align the openings in the plastic and steel layers in order to maintain proper clearance for receiving the hexagonal end of the roller shaft. When using a standard 7/16" roller shaft, the openings formed in the multi-layer reinforcement strip should have a nominal 0.005" clearance in order to facilitate installation. Alternatively, the plastic and metal layers may be bonded using a suitable adhesive with bond to the selected materials.

Utilizing the multi-layer reinforcement strips previously described, worn roller conveyors can be repaired and the repair life significantly extended by installing a plurality of elongated multi-layer reinforcement strips in abutting attachment to the worn frame rails. The openings in the multi-layer reinforcement strip serve to re-align and support hexagonal ends of a series of roller support shafts which extend through the worn frame rails.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A reconditioned roller conveyor assembly comprising:
   a pair of transversely spaced apart elongate frame rails having a series of openings formed therein sized to receive the ends of roller support shafts, the openings having become worn;
   a plurality of rollers extending between the spaced apart elongate frame rails, wherein the rollers are mounted on the roller support shafts; and
   an elongated multi-layer reinforcement strip having at least one layer of sheet metal and at least one layer of high density plastic material, the multi-layer reinforcement strip having a plurality openings formed there though corresponding in size and spacing to the series of openings in the frame rail prior to becoming worn;
   wherein the multi-layer reinforcement strip is attached to a frame rail which has been worn to realign the rollers and reduce vibration.

2. The assembly of claim 1 wherein the at least one layer of high density plastic material comprises Polyethylene.

3. The assembly of claim 1 wherein the at least one layer of high density plastic material comprises UHMW Polyethylene.

4. The assembly of claim 1 wherein the at least one layer of sheet metal comprises a steel sheet and the at least one layer of high density plastic material comprises two layers of plastic material that sandwich the steel sheet there between.

5. The assembly of claim 4 wherein the two layers of high density plastic material comprise layers of UHMW Polyethylene each having a thickness falling in the range of 0.050 to 0.150 inches.

6. The assembly of claim 4 wherein the sheet steel layer has a thickness falling in the range of 0.062 to 0.200 inches.

7. The assembly of claim 1 wherein the plurality openings formed in the multi-layer reinforcement strip having a hexagonal hole shape.

8. The assembly of claim 1 wherein the plurality openings formed in the multi-layer reinforcement strip having a hexagonal open slot shape.

9. The assembly of claim 1 wherein the multi-layer reinforcement strip has formed therein a plurality of spaced apart apertures for receiving fasteners for attaching the elongated multi-layer reinforcement strip to a worn frame rail.

10. The assembly of claim 1 wherein the at least one layer of sheet metal comprises steel sheet and the at least one layer of high density plastic material comprises two layers of plastic material hot press laminated to the steel sheet to securely bond to and sandwich the steel sheet there between.

11. The assembly of claim 1 wherein the at least one layer of sheet metal comprises steel sheet and the at least one layer of high density plastic material comprises two layers of plastic material insert injection molded about the steel sheet layer to securely bond to and sandwich the steel sheet layer there between.

12. The assembly of claim 1 wherein the at least one layer of sheet metal comprises a steel sheet and the at least one layer of high density plastic material comprises a single layer of plastic material bonded to one side of the steel sheet.

13. A roller conveyor assembly comprising:

a pair of transversely spaced apart elongate frame rails having a series of openings formed therein sized to receive hexagonal ends of roller support shafts;

a plurality of rollers mounted on the roller support shafts extending between the spaced apart elongate frame rails;

at least one elongated multi-layer reinforcement strip having at least one layer of steel sheet and two layers of high density plastic material bonded to opposite sides of the steel layer to sandwich the steel layer there between, the at least one multi-layer reinforcement strip having a plurality openings formed there though corresponding in size and spacing to the series of openings in the frame rail;

the at least one multi-layer reinforcement strip further having formed therein a plurality of spaced apart apertures for receiving fasteners to attach the elongated multi-layer reinforcement strip to the frame rail to align the rollers and reduce vibration.

14. The assembly of claim 13 wherein the at least one layer of high density plastic material comprises a material which is good a conductor of static electricity in order to dissipate static electricity buildup without using a ground strap.

15. A method of repairing worn frame rails of a roller conveyor having a pair of spaced apart frame rails with a series of openings formed therein for receiving the hexagonal ends of a series of roller support shafts, the method comprising:

providing a plurality of elongated multi-layer reinforcement strips having at least one layer of sheet metal and at least one layer of high density plastic material, the multi-layer reinforcement strip having a plurality openings formed there though corresponding in size and spacing to the series of openings in the frame rail prior to becoming worn; and installing the plurality of elongated multi-layer reinforcement strips in abutting attachment to the worn frame rails of a roller conveyor adjacent the series of openings formed therein so that the hexagonal ends of a series of roller support shafts extend through the frame rails and are supported by a plurality of openings formed in the elongated multi-layer reinforcement strips thereby realigning the rollers and reducing conveyor vibration.

* * * * *